United States Patent
McConnell (10) Patent No.: US 8,082,506 B1
(45) Date of Patent: Dec. 20, 2011

(54) GEOGRAPHICAL VULNERABILITY MITIGATION RESPONSE MAPPING SYSTEM

(75) Inventor: James Trent McConnell, Keller, TX (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 1147 days.

(21) Appl. No.: 10/916,872

(22) Filed: Aug. 12, 2004

(51) Int. Cl.
*G06F 15/177* (2006.01)
*G06F 3/048* (2006.01)
*G06F 15/173* (2006.01)

(52) U.S. Cl. ......... 715/736; 715/734; 715/763; 709/223

(58) Field of Classification Search .................. 715/736, 715/734, 763; 709/223
See application file for complete search history.

(56) References Cited

U.S. PATENT DOCUMENTS

| | | | |
|---|---|---|---|
| 4,729,737 A | 3/1988 | Reagan et al. | |
| 5,515,285 A | 5/1996 | Garrett, Sr. et al. | |
| 5,848,373 A * | 12/1998 | DeLorme et al. | 701/200 |
| 5,940,598 A | 8/1999 | Strauss et al. | |
| 6,088,804 A * | 7/2000 | Hill et al. | 726/25 |
| 6,163,604 A | 12/2000 | Baulier et al. | |
| 6,240,360 B1 * | 5/2001 | Phelan | 701/208 |
| 6,377,987 B1 * | 4/2002 | Kracht | 709/220 |
| 6,430,274 B1 | 8/2002 | Winstead et al. | |
| 6,456,306 B1 * | 9/2002 | Chin et al. | 715/810 |
| 6,456,852 B2 * | 9/2002 | Bar et al. | 455/456.1 |
| 6,633,230 B2 * | 10/2003 | Grandin et al. | 340/506 |
| 6,691,161 B1 * | 2/2004 | Cook et al. | 709/223 |
| 6,691,256 B1 * | 2/2004 | Cook et al. | 714/43 |
| 6,813,777 B1 | 11/2004 | Weinberger et al. | |
| 6,816,090 B2 | 11/2004 | Teckchandani et al. | |
| 6,832,247 B1 * | 12/2004 | Cochran et al. | 709/223 |
| 6,839,852 B1 | 1/2005 | Pantuso et al. | |
| 6,900,822 B2 * | 5/2005 | Germain et al. | 715/736 |
| 6,917,288 B2 * | 7/2005 | Kimmel et al. | 340/511 |
| 6,941,359 B1 * | 9/2005 | Beaudoin et al. | 709/221 |
| 7,031,728 B2 * | 4/2006 | Beyer, Jr. | 455/456.3 |
| 7,082,535 B1 | 7/2006 | Norman et al. | |
| 7,146,568 B2 * | 12/2006 | Richardson | 715/736 |
| 7,227,950 B2 | 6/2007 | Faith et al. | |
| 7,243,008 B2 | 7/2007 | Stockdale et al. | |
| 7,260,844 B1 * | 8/2007 | Tidwell et al. | 726/22 |
| 7,269,796 B1 * | 9/2007 | Bayes et al. | 715/766 |
| 7,272,648 B2 * | 9/2007 | Kawasaki et al. | 709/224 |
| 7,272,795 B2 * | 9/2007 | Garding et al. | 715/736 |
| 7,337,222 B1 * | 2/2008 | Du et al. | 709/223 |
| 7,337,408 B2 * | 2/2008 | DeLuca et al. | 715/763 |
| 7,342,581 B2 * | 3/2008 | Vinberg | 345/440 |
| 7,349,982 B2 * | 3/2008 | Hannum et al. | 709/238 |
| 7,418,733 B2 | 8/2008 | Connary et al. | |
| 2003/0018769 A1 | 1/2003 | Foulger et al. | |
| 2003/0115211 A1 | 6/2003 | Chen et al. | |
| 2003/0200347 A1 | 10/2003 | Weitzman | |

(Continued)

OTHER PUBLICATIONS

Brown et al., "Crime Mapping for Computer Crimes", Charlottesville, VA, Jun. 9, 2000.

(Continued)

*Primary Examiner* — William Bashore
*Assistant Examiner* — David Phantana-angkool (57) ABSTRACT

Systems and methods for geographically mapping a vulnerability of a network having one or more network points include receiving vulnerability information identifying a vulnerability of a point of the network, correlating the vulnerability information with location information for the identified network point, and network identification information for the identified network point, and generating a map displaying a geographical location of the vulnerability.

27 Claims, 9 Drawing Sheets

U.S. PATENT DOCUMENTS

| | | |
|---|---|---|
| 2003/0232598 A1 | 12/2003 | Aljadeff et al. |
| 2004/0003285 A1 | 1/2004 | Whelan et al. |
| 2004/0044912 A1 | 3/2004 | Connary et al. |
| 2004/0117624 A1 | 6/2004 | Brandt et al. |
| 2004/0172466 A1 | 9/2004 | Douglas et al. |
| 2004/0233234 A1 | 11/2004 | Chaudhry et al. |
| 2004/0240297 A1 | 12/2004 | Shimooka et al. |
| 2005/0206513 A1 | 9/2005 | Fallon |
| 2006/0004497 A1 | 1/2006 | Bull |
| 2006/0041345 A1 | 2/2006 | Metcalf |
| 2007/0079243 A1 * | 4/2007 | Leigh et al. .................. 715/736 |
| 2007/0204033 A1 | 8/2007 | Bookbinder et al. |

OTHER PUBLICATIONS

Brown et al., *Crime Mapping for Computer Crimes*, Charlottesville, VA, Jun. 9, 2000, 6 pages.

Office Action, Notification Date Apr. 15, 2008, in U.S. Appl. No. 10/916,873.

Office Action mailed Apr. 15, 2008 in U.S. Appl. No. 10/916,873 (9 pages).

\* cited by examiner

| Vulnerability Name | Vulnerable IP |
|---|---|
| RPC Bo | 10.1.1.1 |
| SSH Bo | 10.1.1.2 |
| RPC Bo | 10.1.2.1 |

| IP Address | Router Address |
|---|---|
| 10.1.1.1 | 02-69-8C-01-02-03 |
| 10.1.1.2 | 02-69-8C-01-02-03 |
| 10.1.2.1 | 02-69-8C-01-02-04 |

| Router Logical Address | Router Physical Address | City | State | Zip Code |
|---|---|---|---|---|
| 02-69-8C-01-02-03 | 7979 Beltline Road | Irving | TX | 75039 |
| 02-69-8C-01-02-04 | 2319 E. Fowler Avenue | Tampa | FL | 33612 |

| Vulnerability Name | Vulnerable IP | Address | City | State | ZIP | Status | Assigned to |
|---|---|---|---|---|---|---|---|
| RPC Bo | 10.1.1.1 | 7979 Beltline Road | Irving | TX | 75039 | Fixed | Tom |
| RPC Bo | 10.1.2.1 | 2319 E. Fowler Avenue | Tampa | FL | 33612 | Open | Fred |
| SSH Bo | 10.1.1.2 | 7979 Beltline Road | Irving | TX | 75039 | Fixed | Mary |

GEOGRAPHICAL VULNERABILITY MITIGATION RESPONSE MAPPING SYSTEM

FIELD

This invention relates to a system and method to geographically map internal sources of cyber or digital security vulnerabilities in near or post real time for a physically focused mitigation response.

BACKGROUND

When a vulnerability in computer or telecommunications systems is proactively discovered to have a potential impact on an environment, response resources must be directed to a physical location. In practice, this requires extensive efforts to correlate existing threat information, router traffic information and physical location of the router, dramatically reducing response time. For example, today, most responses to a vulnerability require manual review of TCP/IP switch information, manual drawing of network "maps" and, most importantly, trying to mitigate a vulnerability in a sequential or business prioritization order while these efforts are being undertaken. These response schemes do not allow for an organization's management to easily identify the geographical location of the problem(s) and the location(s) at which resources are most needed. Furthermore, current response schemes do not allow an organization's response or management team timely access to geographical view(s) of the location of the vulnerabilities together with information relating to the status or progress of the response to the vulnerability.

SUMMARY

Consistent with the invention, systems and methods for geographically mapping a vulnerability of a network having one or more network points include receiving vulnerability information identifying a vulnerability of a point of the network, correlating the vulnerability information with location information for the identified network point, and network identification information for the identified network point, and generating a map displaying a geographical location of the vulnerability.

Additional objects and advantages will be set forth in part in the description which follows, and in part will be obvious from the description, or may be learned by practice of the invention. The objects and advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments, examples of which are illustrated in the accompanying drawings. Wherever possible, the same reference numbers will be used throughout the drawings to refer to the same or like parts. It is to be understood that both the foregoing general description and the following detailed description are exemplary and explanatory only and are not restrictive of the invention, as claimed.

As used herein, an "intrusion" is an unauthorized use, attempt, or successful entry into a digital, computerized, or automated system, requiring a response from a human administrator or response team to mitigate any damage or unwanted consequences of the entry. For example, the introduction of a virus and the unauthorized entry into a system by a hacker are each "intrusions" within the spirit of the present invention. An "intrusion response" is a response by administrators or human operators to mitigate damage from the intrusion or prevent future intrusions. One of ordinary skill in the art will recognize that, within the spirit and scope of the present invention, "intrusions" of many types and natures are contemplated.

In addition, as used herein, a "vulnerability" is a prospective intrusion, that is, a location in a digital, computerized, or automated system, at which an unauthorized use, attempt, or successful entry is possible or easier than at other points in the system. For example, a specific weakness may be identified in a particular operating system, such as Microsoft's Windows™ operating system when running less than Service Pack 6. Then, all computers running the Windows operating system with less than Service Pack 6 will therefore have this vulnerability. One of ordinary skill in the art will recognize that this and other vulnerabilities may be identified by commercially available software products. While methods of locating such vulnerabilities are outside the scope of the present invention, one of ordinary skill in the art will recognize that any of the vulnerabilities identified or located by such software products, now known or later developed, are within the spirit of the present invention.

In addition, as used herein, a "mitigation response" is the effort undertaken to reduce unwanted consequences or to eliminate the possibility of a vulnerability or intrusion. For example, such a response may entail sending a human computer administrator to the site of the location to update software, install anti-virus software, eliminate a virus, or perform other necessary tasks. In addition, a response may entail installing a patch to the vulnerable computer, such as across a network. One of ordinary skill in the art will recognize that the present invention does not contemplate any specific responses. Instead, any response to a vulnerability or intrusion requiring the organization of resources is within the scope and spirit of the present invention.

For the ease of discussion, the following discussion will discuss the systems and methods of the present invention in terms of mapping "vulnerabilities". However, these same systems and methods are equally applicable to mapping "intrusions".

Figure 1:
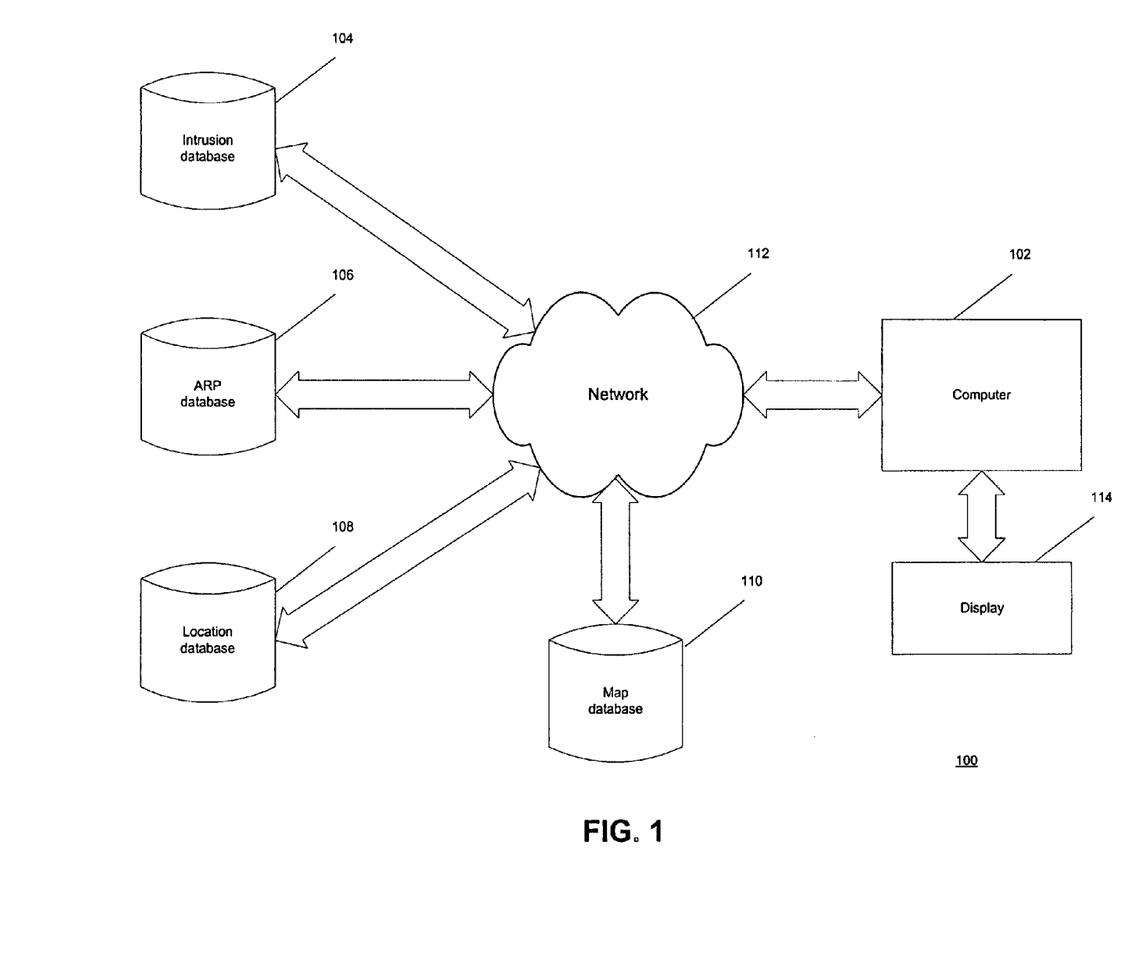
FIG. 1 is a block diagram of an exemplary environment in which the systems and methods of the present invention may be implemented.

FIG. 1 is a block diagram of one exemplary environment in which the systems and methods of the present invention may be implemented. As shown in FIG. 1, system 100 employs mapping computer 102. In addition, system 100 may also employ databases such as vulnerability database 104, Address Routing Protocol (ARP) database 106, location database 108, and map database 110, each in electronic communication with mapping computer 102. System 100 also includes a display 114, such as a video display, for displaying the geographic information correlated and mapped by computer 102 using the methods discussed herein, and a network 112 in electronic communication with computer 102, in which the intrusions and vulnerabilities may occur.

In one embodiment, vulnerability database 104 may contain information identifying a vulnerability in the system, such as, for example, the vulnerability type, description, and impacted device, such as an IP Address of the impacted device (i.e., network point or computer). ARP database 106 may contain network location or identification information such as the IP and/or MAC address for one or more network points representing an impacted device (i.e., network point or computer). Location database 108 may contain geographical information such as the physical address or GPS coordinates of a potential point of entry. Finally, map database 110 may correlate and contain information from the vulnerability, ARP, and location databases as described below to map the vulnerabilities.

Figure 2:
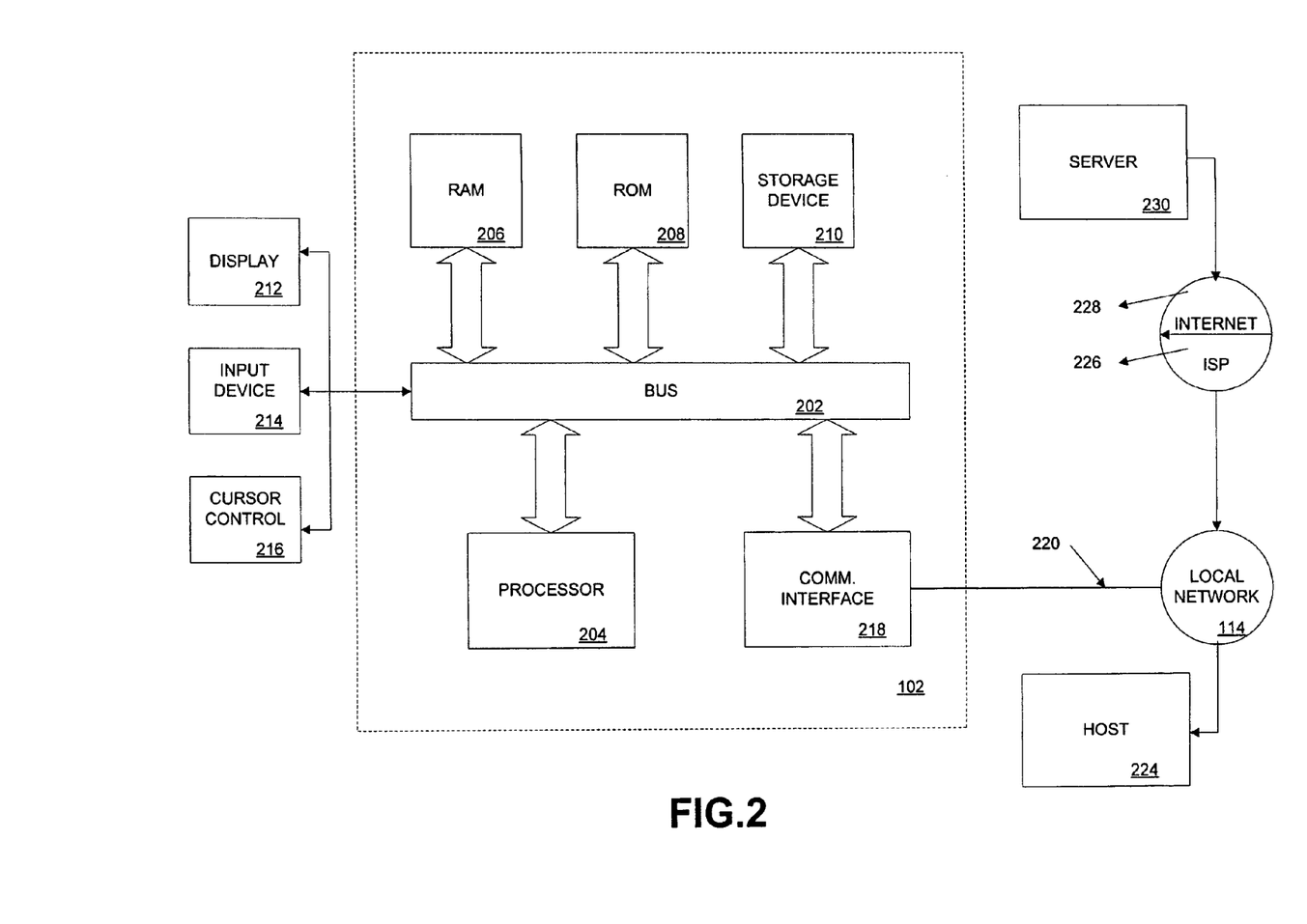
FIG. 2 is a block diagram of an exemplary embodiment of a mapping computer.

FIG. 2 is a block diagram illustrating an exemplary mapping computer 102 for use in system 100, consistent with the present invention. Computer 102 includes a bus 202 or other communication mechanism for communicating information, and a processor 204 coupled to bus 202 for processing information. Computer 102 also includes a main memory, such as a random access memory (RAM) 206, coupled to bus 202 for storing information and instructions during execution by processor 204. RAM 206 also may be used for storing temporary variables or other intermediate information during execution of instructions to be executed by processor 204. Computer system 102 further includes a read only memory (ROM) 208 or other storage device coupled to bus 202 for storing static information and instructions for processor 204. A mass storage device 210, such as a magnetic disk or optical disk, is provided and coupled to bus 202 for storing information and instructions.

Computer 102 may be coupled via bus 202 to a display 212, such as a cathode ray tube (CRT), for displaying information to a computer user. Display 212 may, in one embodiment, operate as display 114.

Computer 102 may further be coupled to an input device 214, such as a keyboard, is coupled to bus 202 for communicating information and command selections to processor 204. Another type of user input device is a cursor control 216, such as a mouse, a trackball or cursor direction keys for communicating direction information and command selections to processor 204 and for controlling cursor movement on display 212. Cursor control 216 typically has two degrees of freedom in two axes, a first axis (e.g., x) and a second axis (e.g., y), which allow the device to specify positions in a plane.

According to one embodiment, computer 102 executes instructions for geographic mapping of vulnerability or intrusion information. Either alone or in combination with another computer system, computer 102 thus permits the geographic mapping of one or more vulnerabilities in response to processor 204 executing one or more sequences of instructions contained in RAM 206. Such instructions may be read into RAM 206 from another computer-readable medium, such as storage device 210. Execution of the sequences of instructions contained in RAM 206 causes processor 204 to perform the functions of mapping computer 102, and/or the process stages described herein. In an alternative implementation, hard-wired circuitry may be used in place of, or in combination with software instructions to implement the invention. Thus, implementations consistent with the principles of the present invention are not limited to any specific combination of hardware circuitry and software.

The term "computer-readable medium" as used herein refers to any media that participates in providing instructions to processor 204 for execution. Such a medium may take many forms, including but not limited to, non-volatile, volatile media, and transmission media. Non-volatile media includes, for example, optical or magnetic disks, such as storage device 210. Volatile media includes dynamic memory, such as RAM 206. Transmission media includes coaxial cables, copper wire and fiber optics, including the wires that comprise bus 202. Transmission media may also take the form of acoustic or light waves, such as those generated during radio-wave and infra-red data communications.

Common forms of computer-readable media include, for example, a floppy disk, flexible disk, hard disk, magnetic tape, or any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer may read. For the purposes of this discussion, carrier waves are the signals which carry the data to and from computer 102.

Various forms of computer-readable media may be involved in carrying one or more sequences of one or more instructions to processor 204 for execution. For example, the instructions may initially be carried on the magnetic disk of a remote computer. The remote computer may load the instructions into a dynamic memory and send the instructions over a telephone line using a modem. A modem local to computer 102 may receive the data on the telephone line and use an infra-red transmitter to convert the data to an infra-red signal. An infra-red detector coupled to bus 202 may receive the data carried in the infra-red signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer 102 may also include a communication interface 218 coupled to bus 202. Communication interface 218 provides a two-way data communication coupling to a network link 220 that may be connected to network 112. Network 112 may be a local area network (LAN), wide area network (WAN), or any other network configuration. For example, communication interface 218 may be an integrated services digital network (ISDN) card or a modem to provide a data communication connection to a corresponding type of telephone line. Computer 102 may communicate with a host 224 via network 112. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. In this embodiment, network 112 may communicate with an Internet Service Provider (ISP) 226. For example, network link 220 may provide a connection to data equipment operated by the ISP 226. ISP 226, in turn, provides data communication services from another server 230 or host 224 to computer 102. Network 112 may use electric, electromagnetic or optical signals that carry digital data streams.

Computer 102 may send messages and receive data, including program code, through network 112, network link 220 and communication interface 218. In this embodiment, server 230 may download an application program to computer 102 via network 112 and communication interface 218. Consistent with the present invention, one such downloaded application geographically maps vulnerability or intrusion information, such as, for example, by executing methods 300 and/or 900, to be described below. The received code may be executed by processor 204 as it is received and/or stored in storage device 210, or other non-volatile storage for later execution.

Although computer system 102 is shown in FIG. 2 as connectable to server 230, those skilled in the art will recognize that computer system 102 may establish connections to multiple servers on Internet 228 and/or network 112. Such servers may include HTML-based Internet applications to provide information to computer system 102 upon request in a manner consistent with the present invention.

Returning to FIG. 1, display 114 may, in one embodiment, be implemented as display 212 (FIG. 2), directly connected to computer 102. In an alternative embodiment, display 114 may be connected to computer 102 via network 112. For example, display 114 may be a display connected to another computer on network 112, or may be a stand-alone display device such as a video projector connected to computer 102 via network 112.

In addition, databases 104, 106, 108, and 110 may each reside within computer 102 or may reside in any other location, such as on network 112, so long as they are in electronic communication with computer 102. In one embodiment, ARP database 106 may be a technical table such as the type typically resident in router points in a computer network, in which information such as the MAC address, IP address and Router (IP/MAC address) is kept.

In one embodiment, location database 108 is a static database in which the physical location of routers or network points is located. Such location information may include router (IP/MAC) address, router (or network point) physical address, and router (or network point) geographic locations, such as GPS coordinates. Accordingly, one of ordinary skill in the art will recognize that ARP database 106 and location database 108 may be kept in accordance with any now known or later developed methods for implementing and maintaining ARP information at router points, or physical location information, respectively.

In an alternative embodiment, databases 104, 106, 108, and 110, may be implemented as a single database, or may be implemented as any number of databases. For example, one of ordinary skill in the art will recognize that system 100 may include multiple ARP databases, such as having one for each router (not shown) in the system. Similarly, system 100 may include multiple vulnerability, location, and map databases. Furthermore, in one embodiment, databases 104, 106, 108, and 110 may be implemented as a single database containing all of the described information. One of ordinary skill in the art will recognize that system 100 may include any number (one or more) of databases so long as the information discussed herein may be retrieved and correlated as discussed herein.

Finally, databases 104, 106, 108, and 110 may be implemented using any now known or later developed database schemes or database software. For example, in one embodiment, each of the databases may be implemented using a relational database scheme, and/or may be built using Microsoft Access™ or Microsoft Excel™ software. While, more likely, one or more databases will be implemented to take into account other factors outside the scope of the present invention (for example, ARP database 106 may require specific format or implementation dependent on the router within which it resides), one of ordinary skill in the art will recognize that any implementation (and location) of the present databases is contemplated within the scope and spirit of the present invention.

Figure 3:
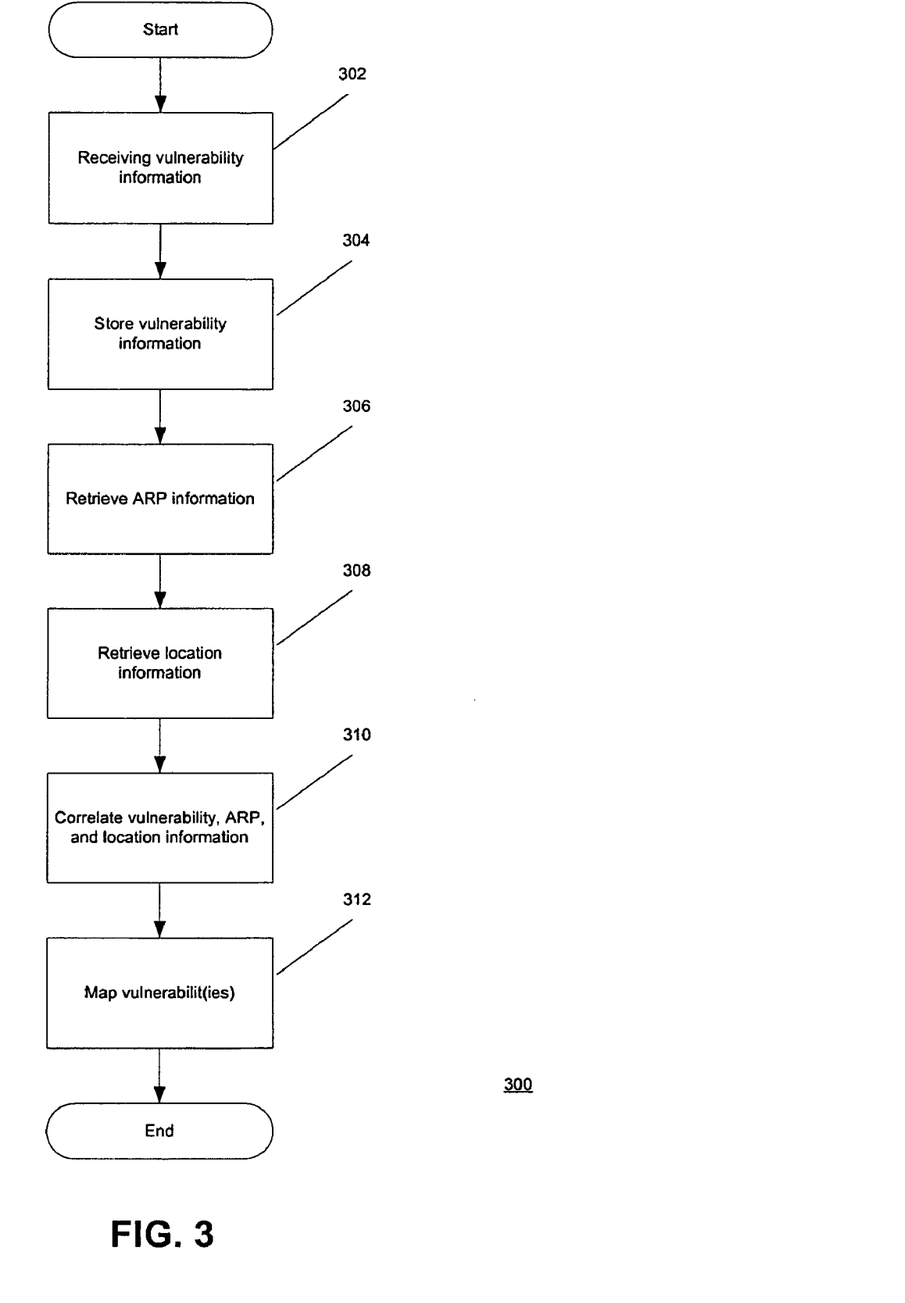
FIG. 3 is a flowchart of an exemplary method for geographically mapping response information.
Figure 4:
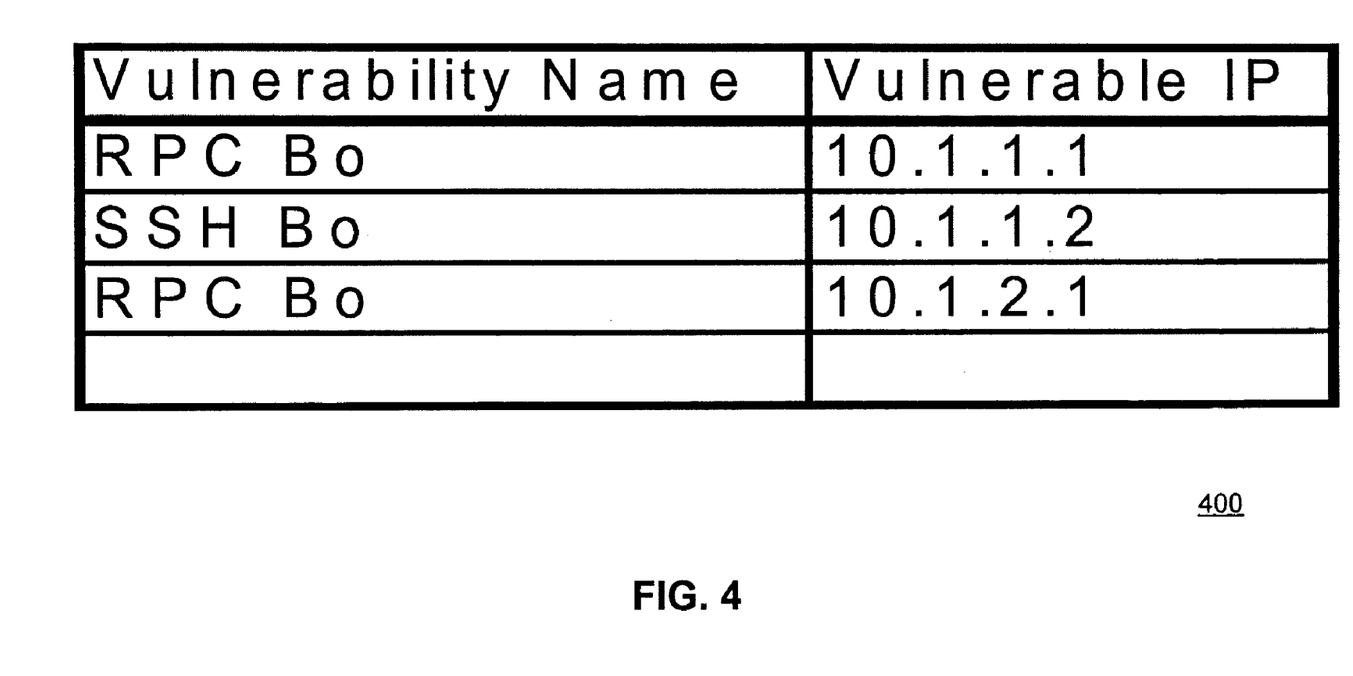
FIG. 4 is an exemplary screenshot of a vulnerability database containing vulnerability information.

FIG. 3 shows a method 300 for execution, such as by computer 102, for geographic mapping of vulnerability information, consistent with the present invention. Method 300 begins by receiving vulnerability information, stage 302, such as from a computer administrator, as the output of software designed to detect or discover vulnerabilities, or from any other source. In one embodiment, the vulnerability information, may include an identification (such as the IP address) of the computer where the vulnerability exists, and the name and description of the vulnerability, among other information. Upon receipt of the vulnerability information, it is stored in vulnerability database 104, stage 304. FIG. 4 shows one embodiment of vulnerability information 400 within vulnerability database 104.

Figure 5:
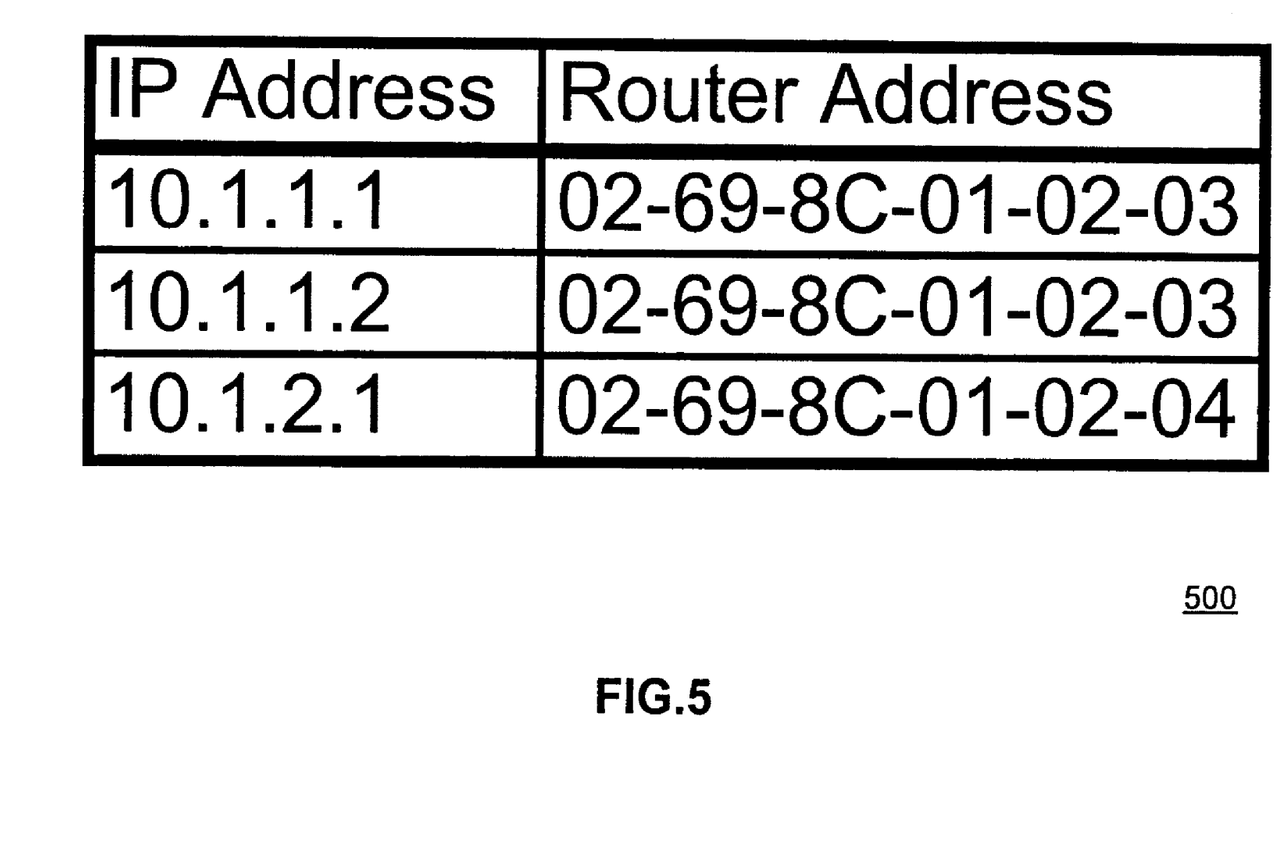
FIG. 5 is an exemplary screenshot of records in an ARP database.

Returning to FIG. 3, computer 102 then retrieves for computers (or network points) at which a vulnerability exists, ARP information for that computer (or network point) from ARP database 106, stage 306. In one embodiment, the vulnerability information (such as the IP address) may be used as a key to retrieve the appropriate record from ARP database 106. The ARP information may include the MAC address, and router IP/MAC address or any other network address information of the network point at which the vulnerability exists, as necessary. FIG. 5 shows one exemplary embodiment 500 of the ARP information within ARP database 106.

Figure 6:
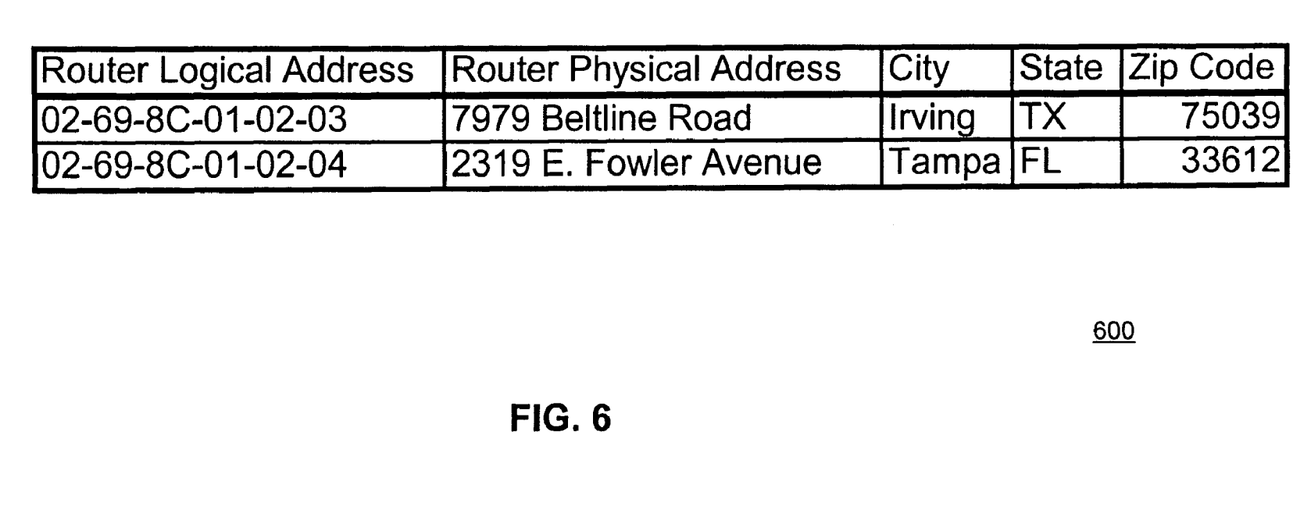
FIG. 6 is an exemplary screenshot of records in a location database.

In addition, computer 102 may also retrieve geographic location information for the computer at which the vulnerability exists, from location database 108, stage 308. In one embodiment, the vulnerability data (such as IP address) and/or the ARP data (such as the router IP/MAC address) may be used as a key to identify a record corresponding to the location database record(s), corresponding to the vulnerable network point. The location information retrieved may include such information as the physical location (e.g., mailing address or GPS coordinates) for the identified vulnerable network point or computer. FIG. 6 shows one exemplary embodiment 600 of the location information within location database 108.

Figure 7:
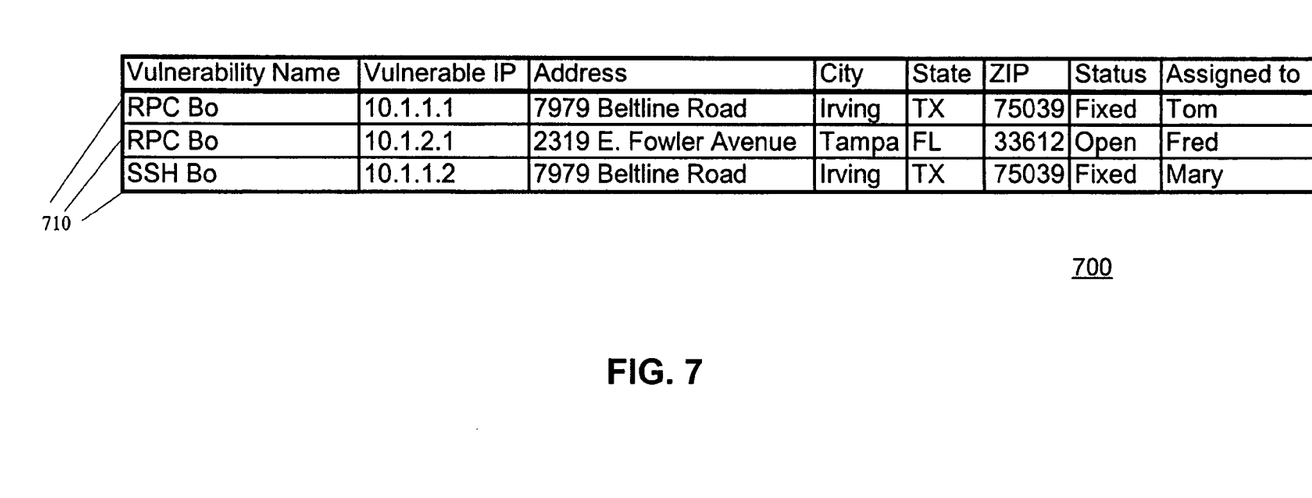
FIG. 7 is an exemplary screenshot of records in a map database containing information for mapping vulnerabilities.

Once this information has been retrieved from databases 104, 106, and 108, it is stored in map database 110, stage 310. Within map database 110, the retrieved information is preferably correlated such that all information for a particular vulnerability is stored in a record for that vulnerable device. For example, FIG. 7 shows an exemplary screenshot 700 of records in map database 110. As shown, map database records 710 may contain the vulnerability information, the network address (such as the IP or MAC address from ARP database 106), and the physical location, such as the mailing address, or GPS information (from location database 108). In addition, map database records 710 may also include a status of the vulnerability and an indication of the response person or team assigned to respond to the vulnerability.

Upon correlating this information within map database 110, computer 102 then maps the location of the vulnerability, stage 312. In one embodiment, the location information for each record is imported into a commercially available mapping program such as Microsoft Mapppoint™ to visually locate the vulnerable points in the geographical representation of the company on a map. In one embodiment, the map may represent each of the vulnerabilities as a symbol on the map, for example, as a "push pin." An exemplary map 800 using this push pin approach is shown as FIG. 8. Within map 800, each pushpin 802, 804, shows the location of a point of vulnerability requiring a response.

Figure 8:
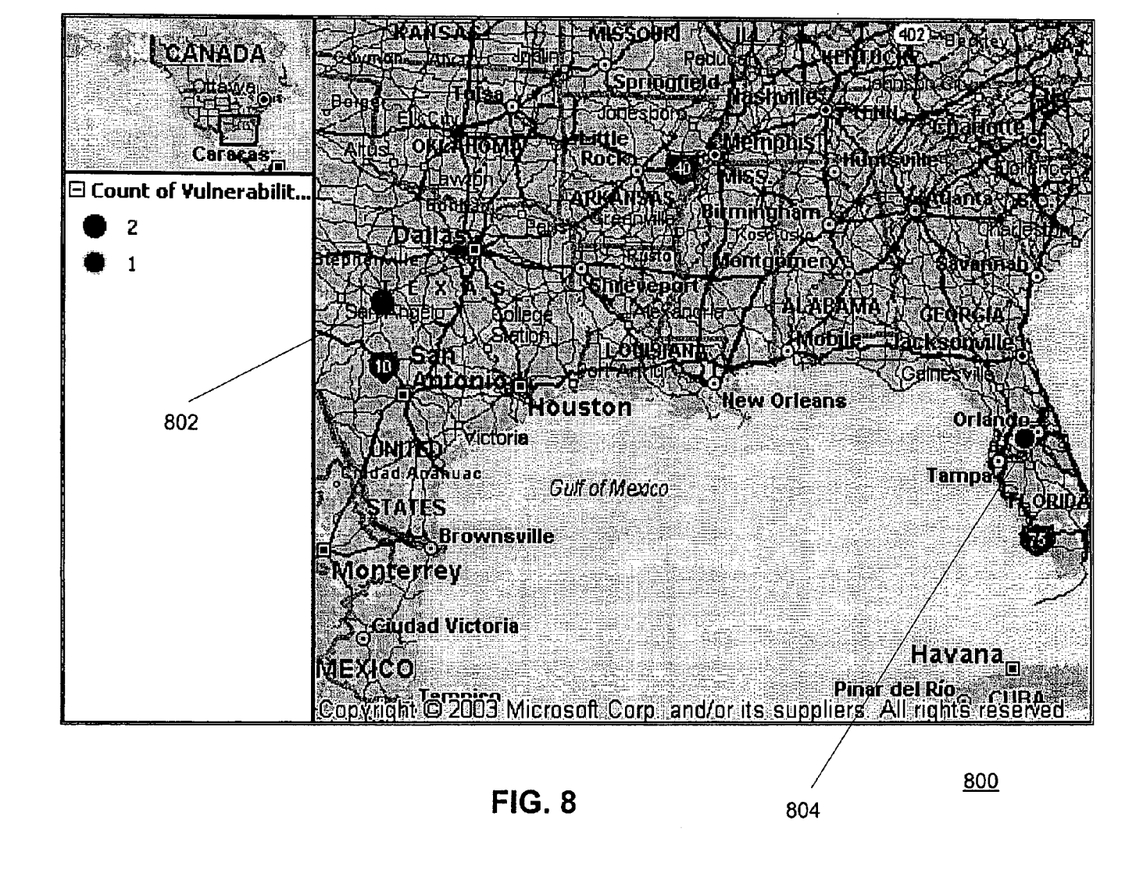
FIG. 8 is an exemplary screenshot of a map geographically mapping vulnerabilities consistent with the present invention.

Using map 800, response teams or system administrators will be able to identify "pockets" of vulnerabilities and will be able to better prioritize and more efficiently schedule response personnel to respond and mitigate or eliminate the vulnerability, based on geographic location. For example, the color of the push-pin symbol, or representation on the map, may be used to identify the quantity of vulnerable points in an area on the map, allowing the administrators to identify such "pockets." In addition, the symbol (i.e., push-pin or other symbol) may be linked to the underlying data. In this manner, a system user may, using an input device, select a symbol on the map to initiate a display of data such as the vulnerability type, IP address, status of the response, or other information.

Figure 9:
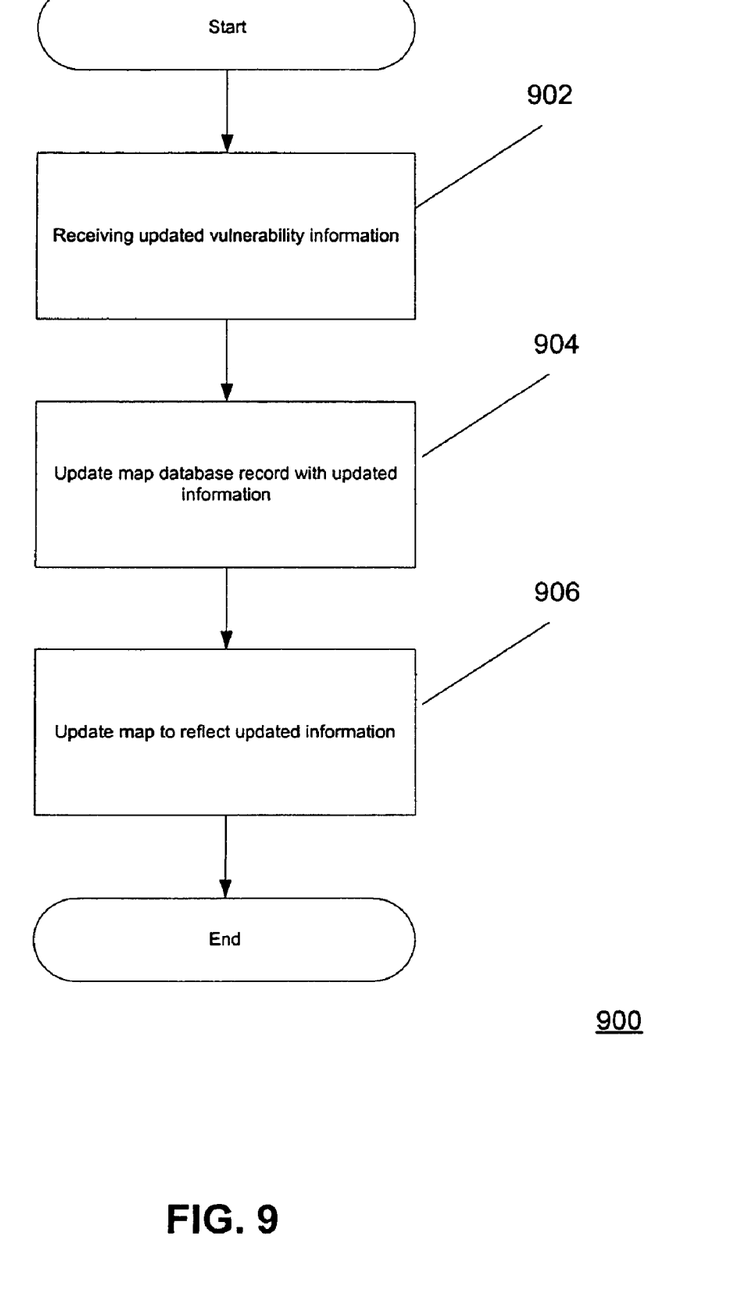
FIG. 9 is a flowchart showing an exemplary method for updating a geographic map with progress information.

FIG. 9 shows a flowchart of a method 900 for updating the geographic map with progress information. Method 900 begins with a response team or system administrator sending an update to the system to advise of a new status of a vulnerability, stage 902. For example, the response team may advise the system that the vulnerable computer must be replaced, and be rendered inactive until it is replaced, (i.e., the vulnerability is "open") or may advise the system that the vulnerable computer has been upgraded and is no longer vulnerable (i.e., the vulnerability if "fixed").

Once this information is received, the map database record for the identified vulnerability is updated, stage 904. For example, each vulnerability record in the database may contain a field to identify the status of the vulnerability (see FIG. 7). Possible status indicators may reflect that the vulnerability is "new," "open" (i.e., not yet responded to), "assigned to a response team," "closed" (i.e., responded to and fixed), or any other status that may be of use to the organization for which the system has been implemented.

Once the map database record has been updated, map computer 102 can update map 800 to reflect the updated status of the vulnerability. For example, one way that map 800 can show the status information is to display color-coded push pin symbols to reflect the status. In one embodiment, a red push pin may signify an "open" or "new" vulnerability, a yellow push pin may signify a vulnerability that has been assigned, but not yet fixed, and a green push pin may signify a closed vulnerability. By mapping this information together with the locations of the vulnerabilities, administrators can better track the progress of their response teams, and more fluidly schedule responses to new vulnerabilities as they arise.

One of ordinary skill in the art will recognize that, while the present invention discusses the systems and methods for mapping vulnerabilities of a system, similar systems and methods may be utilized to map intrusions to the system. For example, referring to FIG. 1, database 104 may maintain intrusion information rather than vulnerability information. Using intrusion database 104, computer 102, through the execution of methods 300 and 900, may geographically map intrusions and update the status of responses to those intrusions, such as is described in U.S. patent application Ser. No. 10/916,873, entitled "Geographical Intrusion Response Prioritization Mapping System," filed concurrently herewith, the contents of which are incorporated by reference in its entirety.

More specifically, with regard to FIG. 3, system 100 may receive intrusion data, stage 302. This information may be received via any source, for example, virus detection software, security software designed to detect unauthorized entry into the system, software designed to identify unauthorized attempts to communicate with a particular port number, or any other now known or later developed method of identifying intrusions.

Once the intrusion information has been received, it is stored in database 104, stage 304. For each intrusion, computer 102 retrieves the ARP information, and location information corresponding to the network point at which the intrusion entered system 100, stages 306 and 308. This information may then be correlated in database 110, (FIG. 3, stage 310). Finally, computer 102 may map the intrusions (FIG. 3, stage 312), and update the map as discussed above (see FIG. 9).

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for displaying a vulnerability of a network comprising one or more network points, the method comprising:

receiving vulnerability information identifying a point of the network as containing a vulnerability, the network vulnerability point comprising a computing device connected to the network and susceptible to unauthorized access;

identifying, based on the vulnerability information, an Internet Protocol (IP) address associated with the network vulnerability point;

retrieving, from an Address Routing Protocol (ARP) database using the IP address, a router address corresponding to the identified network vulnerability point;

retrieving, from a network location database using the retrieved router address, geographical location information associated with the identified network vulnerability point;

storing a vulnerability record for the identified network vulnerability point, the vulnerability record containing the IP address, the router address, the geographical location information, and a current status of a mitigation response to the vulnerability;

generating a geographical map displaying an area including at least the geographical location of the identified network vulnerability point;

displaying a network vulnerability symbol on the map designating the geographical location of the network vulnerability point; and graphically distinguishing a characteristic of the displayed network vulnerability symbol based on the current status of the mitigation response to the vulnerability.

2. The method of claim 1, wherein the vulnerability comprises a plurality of vulnerabilities corresponding to different computers in the network.

3. The method of claim 1, wherein the ARP database resides in a router on the network.

4. The method of claim 1, wherein the network vulnerability symbol is a push-pin symbol.

5. The method of claim 1, further comprising graphically distinguishing a characteristic of the network vulnerability symbol based on a quantity of identified network vulnerability points in the area.

6. The method of claim 1, further comprising updating the current status of the mitigation response to the vulnerability indicated by the vulnerability record.

7. The method of claim 6, wherein:
the network vulnerability symbol comprises a push-pin symbol,
the characteristic of the network vulnerability symbol includes a color of the network vulnerability symbol, and
updating further comprises changing the color of the push-pin symbol based on the updated status of the mitigation response to the vulnerability.

8. The method of claim 1, further comprising modifying the characteristic of the network vulnerability symbol to reflect a change of the current status of the mitigation response to the vulnerability.

9. A computer-readable storage medium containing instructions, which, when executed, perform a method for displaying a vulnerability of a network comprising one or more network points, the method comprising:
receiving vulnerability information identifying a point of the network as containing a vulnerability, the network vulnerability point comprising a computing device connected to the network and susceptible to unauthorized access;
identifying, based on the vulnerability information, an Internet Protocol (IP) address associated with the network vulnerability point;
retrieving, from an Address Routing Protocol (ARP) database using the IP address, a router address corresponding to the identified network vulnerability point;
retrieving, from a network location database using the retrieved router address, geographical location information associated with the identified network vulnerability point using;
storing a vulnerability record for the identified network vulnerability point, the vulnerability record containing the IP address, the router address, the geographical location information, and a current status of a mitigation response to the vulnerability;
generating a geographical map displaying an area including at least the geographical location of the identified network vulnerability point;
displaying a network vulnerability symbol on the map designating the geographical location of the network vulnerability point; and
graphically distinguishing a characteristic of the displayed network vulnerability symbol based on the current status of the mitigation response to the vulnerability.

10. A computer-readable storage medium of claim 9, wherein the vulnerability comprises a plurality of vulnerabilities corresponding to different computers in the network.

11. A computer-readable storage medium of claim 9, wherein the ARP database resides in a router on the network.

12. A computer-readable storage medium of claim 9, wherein the network vulnerability symbol comprises a push-pin symbol.

13. A computer-readable storage medium of claim 9, further comprising graphically distinguishing a characteristic of the network vulnerability symbol based on a quantity of identified network vulnerability points in the area.

14. A computer-readable storage medium of claim 9, wherein the method further comprises updating the current status of the mitigation response to the vulnerability indicated by the vulnerability record.

15. A computer-readable storage medium of claim 14, wherein:
the network vulnerability symbol comprises a push-pin symbol,
the characteristic of the network vulnerability symbol includes a color of the network vulnerability symbol, and
updating comprises changing the color of the push-pin symbol based on the updated status of the mitigation response to the vulnerability.

16. A computer-readable storage medium of claim 9, wherein the method further includes modifying the characteristic of the network vulnerability symbol to reflect a change of the current status of the mitigation response to the vulnerability.

17. A system for geographically mapping a vulnerability of a network comprising a plurality of network points, the system comprising:
a network location database storing geographical location information about points on the network;
a map database storing map information;
an Address Routing Protocol (ARP) database storing network location information;
a computer configured to:
receive vulnerability information identifying a vulnerability of a point of the network, the network vulnerability point comprising a computing device connected to the network and susceptible to unauthorized access;
identify, based on the vulnerability information, an Internet Protocol (IP) address associated with the network vulnerability point;
retrieve, from the ARP database using the IP address, a router address associated with the identified network vulnerability point;
retrieve, from the network location database using the retrieved router address, geographical location information associated with the identified network vulnerability point;
generate a vulnerability record for the identified network vulnerability point, the vulnerability record containing the IP address, the router address, the geographical location information, and a current status of a mitigation response to the vulnerability;
generate a geographical map displaying an area including at least the geographical location of the identified network vulnerability point;
display a network vulnerability symbol on the map designating the geographical location of the identified network vulnerability point; and
graphically distinguishing a characteristic of the displayed network vulnerability symbol on the map based on the current status of the mitigation response to the vulnerability; and
a display device in electronic communication with the computer for displaying the generated map.

18. The system of claim 17, wherein the vulnerability comprises a plurality of vulnerabilities corresponding to different computers in the network.

19. The system of claim 17, wherein the system further comprises a vulnerability database storing information identifying vulnerabilities in the network.

20. The system of claim 19, wherein the computer is further configured to retrieve the vulnerability information from the vulnerability database and store the retrieved information in the map database.

21. The system of claim 17, wherein the computer is further configured to store the retrieved router address in the map database.

22. The system of claim 17, wherein the ARP database resides in a router on the network.

23. The system of claim 17, wherein the computer is further configured to modify the characteristic of the network vulnerability symbol based on a change of the current status of the mitigation response to the vulnerability.

24. The system of claim 23, wherein:
   the network vulnerability symbol comprises a push-pin symbol,
   the characteristic of the network vulnerability symbol includes a color of the network vulnerability symbol, and
   the computer is further configured to change the color of the push-pin symbol based on the change in the current status of the mitigation response to the vulnerability.

25. The system of claim 17, wherein the network vulnerability symbol comprises a push-pin symbol, and a color of the push-pin symbol indicates the current status of the mitigation response to the vulnerability.

26. A method for displaying a vulnerability of a network comprising one or more network points, the method comprising:
   receiving vulnerability information identifying a point of the network as containing a vulnerability, the network vulnerability point comprising a computing device connected to the network and susceptible to unauthorized access;
   identifying, based on the vulnerability information, an Internet Protocol (IP) address associated with the network vulnerability point;
   retrieving, from an Address Routing Protocol (ARP) database using the IP address, a router address corresponding to the identified network vulnerability point;
   retrieving, from a network location database using the retrieved router address, geographical location information associated with the identified network vulnerability point;
   receiving status information regarding a mitigation response to the vulnerability, the status information indicating whether the vulnerability is pending or closed;
   generating a geographical map displaying an area including at least the geographical location of the identified network vulnerability point;
   displaying a network vulnerability symbol on the map designating the geographical location of the network vulnerability point;
   visually distinguishing the displayed network vulnerability symbol based on the status information, including:
      visually distinguishing the displayed network vulnerability in a first manner when the status information indicates vulnerability is pending; and
      visually distinguishing the displayed network vulnerability symbol in a second manner, distinct from the first manner, when the status information indicates the vulnerability is closed.

27. The method of claim 26, wherein the status information further indicates whether the vulnerability is new, and the method further includes visually distinguishing the displayed network vulnerability symbol in a third manner, distinct from the first and second manners, when the status information indicates the vulnerability is new.

* * * * *